United States Patent [19]

Hildebrandt et al.

[11] 3,917,166
[45] Nov. 4, 1975

[54] DRIP IRRIGATION METHOD

[75] Inventors: Robert W. Hildebrandt, Northridge; Howard Hanks, Jr., Walnut Creek, both of Calif.

[73] Assignee: Andco Incorporated, Buffalo, N.Y.

[22] Filed: Dec. 11, 1974

[21] Appl. No.: 531,736

Related U.S. Application Data

[62] Division of Ser. No. 479,610, June 17, 1974.

[52] U.S. Cl. .................. 239/1; 239/76; 239/391; 239/542; 61/12
[51] Int. Cl.² ... B05B 1/16; B05B 1/20; B05B 12/00
[58] Field of Search ............. 239/1, 11, 71, 76, 390, 239/391, 542; 61/12, 13

[56] References Cited
UNITED STATES PATENTS

| | | | |
|---|---|---|---|
| 1,564,927 | 12/1925 | Ballard | 61/12 X |
| 2,536,196 | 1/1951 | MacLeod | 61/13 |
| 2,598,961 | 6/1952 | Andrus | 239/542 X |
| 3,518,831 | 7/1970 | Tiffals et al. | 239/542 X |
| 3,606,166 | 9/1971 | Whear | 239/542 X |
| 3,797,741 | 3/1974 | Spencer | 239/542 X |
| 3,840,182 | 10/1974 | Geoffroy | 239/542 X |

*Primary Examiner*—Robert S. Ward, Jr.
*Attorney, Agent, or Firm*—Christel & Bean

[57] ABSTRACT

A drip irrigation system and method for installing the same including utilizing a supply of emitters of different flow potential designed to supply a given amount of water at various line pressures. Fluid is delivered through a feed tube at a predetermined flow rate and the pressure at the head end of the tube is maintained at a predetermined level. Openings are formed, in sequence, in the tube at each location where an emitter is to be installed. The pressure at each hole is measured and an emitter of appropriate flow potential is selected and installed at that location to deliver the given amount of water to a plant root area.

4 Claims, 3 Drawing Figures

3,917,166

DRIP IRRIGATION METHOD

This is a division of application Ser. No. 479,610, filed June 17, 1974.

BACKGROUND OF THE INVENTION

This invention relates to irrigation and, more particularly, to drip irrigation.

Drip irrigation has become increasingly popular in recent years because of its inherent advantages over the more conventional methods of irrigation, such as sprinkler and furrow irrigation for example. In a drip irrigation process, a small amount of water is delivered as required to the root areas of plants and trees, confining the water supplied substantially to such root areas. Besides conserving water, equipment and power requirements can be kept to a minimum. A drip irrigation system generally includes a main line connected to a supply of water under pressure and a plurality of feeder tubes for conveying water from the main line to rows of crops or trees. Tapped into each feeder tube are a plurality of emitters for supplying water to specific plant root areas. Problems are encountered in delivering equal amounts of water to all the plant root areas due to pressure variations along the feeder tube because of differences in elevation along the feeder tube and as a result of inherent line pressure losses caused by the water flowing through the tubes for example.

SUMMARY OF THE INVENTION

Accordingly, a primary object of the present invention is to provide an improved drip irrigation emitter installation delivering equal amounts of water to a plurality of plant root areas regardless of line pressure variations.

Another object of this invention is to provide an improved method for installing a drip irrigation system in a simple and efficient manner by unskilled personnel without concern for pressure line loss.

In one aspect thereof, the drip irrigation system of the present invention is characterized by the provision of a supply of emitters of different flow potential for supplying the same given amount of water at various line pressures, respectively. During installation, a predetermined head pressure and flow rate of water is maintained at the beginning of the feeder tube system and holes are successively formed in the tube where emitters are to be installed. Without regard to line pressure losses, the specific line pressure at each hole is measured and an emitter adapted to deliver the desired amount of water at such pressure is selected and installed at that location.

These and other objects, advantages and characterizing features of this invention will become clearly apparent from the ensuing detailed description of an illustrative embodiment thereof, taken together with the accompanying drawing wherein like reference numerals denote like parts throughout.

BRIEF DESCRIPTION OF THE DRAWING FIGURES

DETAILED DESCRIPTION OF AN ILLUSTRATIVE EMBODIMENT

Figure 1:
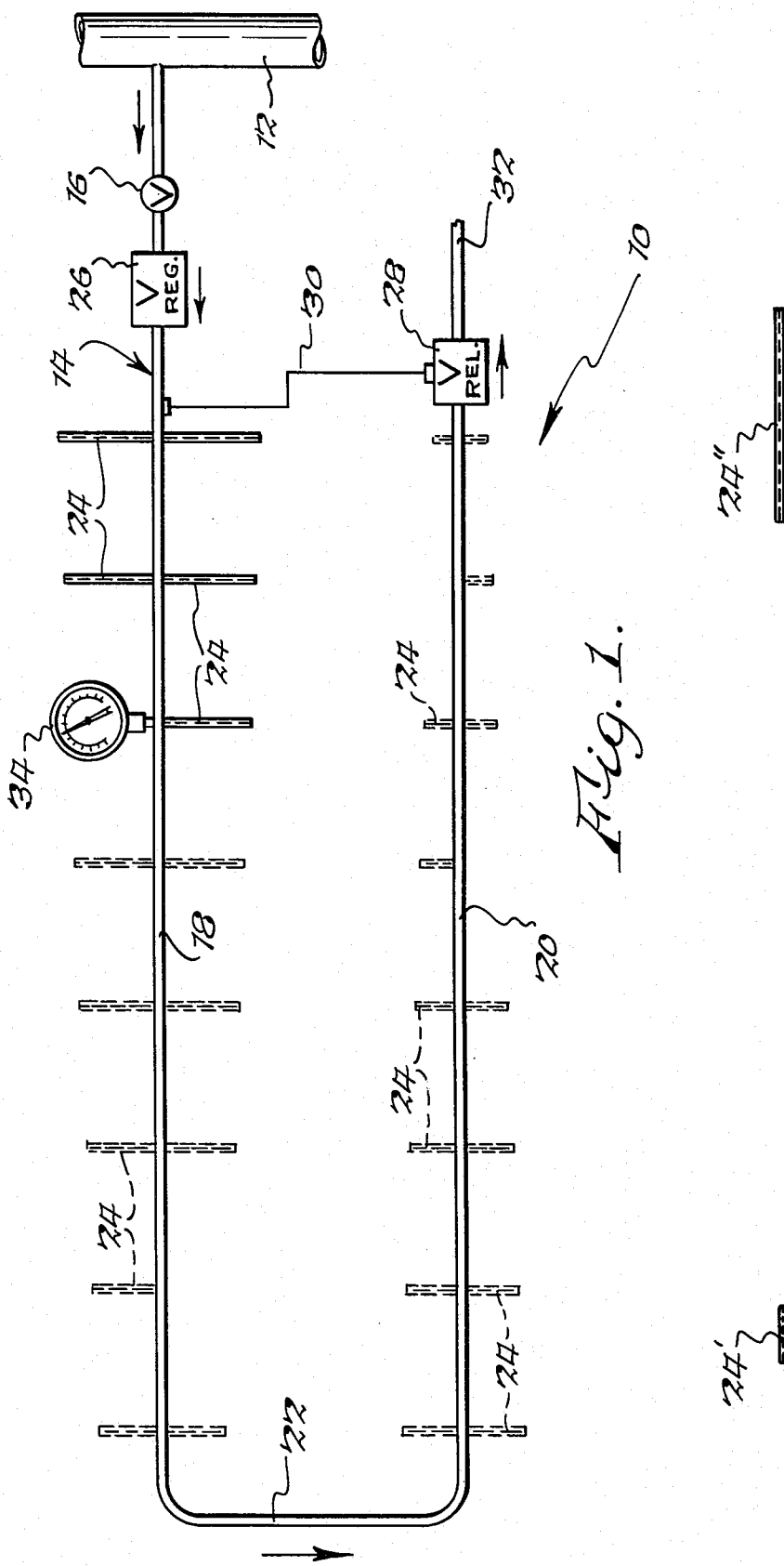
FIG. 1 is a schematic view of a drip irrigation system of this invention.

Referring now in detail to the illustrative embodiment depicted in the drawings, there is schematically shown in FIG. 1 a drip irrigation system, generally designated 10, constructed in accordance with the present invention. Drip irrigation system 10 comprises a main supply line 12 connected at its upstream end to a suitable source of water under pressure (not shown), supply line 12 being of sufficient size to convey all of the water required for the system at the desired pressure.

A plurality of feeder tubes 14 (only one such tube 14 being shown in FIG. 1) are tapped into main supply line 12 at longitudinally spaced intervals therealong. Each of the feeder tubes 14 is formed of a suitable material, preferably a flexible plastic material, adapted to extend along rows of plants or trees and is provided with a shut-off valve 16 controlling the flow of water therethrough. The specific feeder tube 14 shown in FIG. 1 extends in a generally U-shaped path having first and second parallel leg portions 18 and 20 extending in a direction generally normal to main supply line 12 and connected together by a transversely extending, intermediate portion 22. Each portion 18, 20 can extend along a single row of plants or trees or between adjacent rows of plants or trees, as desired. It should be understood that feeder tubes 14 can take various configurations in plan to conform generally to the path or pattern of the rows of plants to be watered.

A plurality of emitters 24 of varying flow potential are installed in feeder tube 14 for distributing the water therefrom to specific plant root areas. Each emitter 24 is designed to dispense a given amount of water within a predetermined time interval at a specific line pressure as will hereinafter be more fully explained. Emitters 24 can be of the wick, bead, or any suitable type, and the various flow potentials can be provided in various ways. In the illustrated embodiment, this is accomplished by utilizing emitter tubing of the same diameter but of different lengths, the shorter lengths having a greater flow potential than the longer ones and therefore capable of providing the same flow rate at a lower pressure. However, the instant invention is not limited to the utilization of emitter tubing of different lengths but can utilize other emitters of varying or variable flow potential.

An automatic flow rate control valve 26, is connected to each feeder tube 14 downstream of the shut-off valve 16. Flow rate control valve 26 can be of any conventional type, such as the Kates Flow Controller for example, and is operative to maintain a selected flow rate and thereby deliver a given amount of water to tube 14 in a given time interval regardless of pressure variations. Thus, the selected flow rate through feeder tube 14 is held constant regardless of the pressure at which the water enters feeder tube 14.

A pressure relief valve 28 is connected to feeder tube 14 adjacent the remote end thereof and downstream of the location for the last emitter 24 intended to be tapped into the system. A sensing conduit 30 connects pressure relief valve 28 to leg portion 18 of feeder tube 14 between flow rate control valve 26 and the first emitter 24 installed in the system. While relief valve 28 is connected to the end of the water distributing system, it measures or senses the pressure at the starting or upstream end thereof and operates to maintain that pressure constant as the emitters are installed. A discharge conduit 32 is connected to pressure relief valve 28 for dumping the excess water not dispensed through emitters 24 of the distribution system.

In designing a drip irrigation system, it is desirable to deliver the same amount of water to each plant root area. However, because the rate of water flow through an emitter varies in accordance with pressure variations, the inherent pressure losses during water flow through feeder tube 14 poses problems in emitter installations when it is desired to supply the same amount of water to the several plant root areas.

Figure 3:
FIGS. 2 and 3 are side elevational view of emitters of different lengths and therefore different flow potentials.
Figure 2:
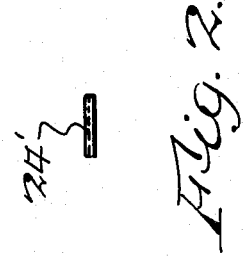

It has been found that variations in line pressure can be accommodated and a constant rate of water flow delivered by using emitters having different flow potentials. By way of example, this can be accomplished with fixed diameter emitter tubing by changing the length thereof. For example, the relatively short emitter 24' shown in FIG. 2 will deliver the same amount of water in a given time period as the longer emitter 24'' of FIG. 3 having the same internal diameter if the pressure acting on the former is correspondingly less than the pressure acting on the water flowing through emitter 24''. Thus, a plurality of emitters 24 of the same diameter tubing but of different lengths and therefore different flow potential can be provided to supply the same given amount of water at various line pressures. In order to install an emitter 24 of appropriate flow potential at a desired point on feeder tube 14, the line pressure at that point must be calculated.

However, the calculation of the line pressure at a specific point along a conduit involves a three dimensional hydraulic problem based on information too sophisticated to be collected and utilized by average field installation personnel. The present invention simplifies the installation of a drip irrigation system whereby the entire system can be installed by the average laborer in a manner assuring delivery of an equal amount of water to all plant root areas. In accordance with the present invention, a field installation of a drip irrigation system is made as follows.

Assuming, for example, that it is desired to supply 25 trees with 4 gallons of water per hour utilizing four emitters 24 per tree root area. The system then would require 100 emitters 24, each capable of dispensing water at the rate of 1 gallon per hour. Also, the total amount of water required would be 100 gallons per hour and consequently, flow rate control valve 26 is set to deliver this amount into feeder tube 14. Pressure relief valve 28 also is set to maintain a predetermined pressure, say 50 psig for example, at the head end of the feeder tube 14, just downstream of flow rate control valve 26. Under these conditions, 100 gallons of water per hour is being delivered through feeder tube 14 while relief valve 28 maintains the pressure at the head end of the system at 50 psig and allows 100 gallons of water per hour to pass therethrough into conduit 32.

The installer then moves down feeder tube 14, punching a hole into feeder tube 14 at the location where an emitter is required and measures the pressure at that specific point by a pressure indicator 34. The pressure at such location will be only slightly less than the 50 psig maintained at the point where sensing conduit 30 is tapped into feeder tube 14, reflecting the slight loss of line pressure through tube 14. The installer then selects from a supply of emitters of different lengths and consequent different flow potentials the specific emitter 24 having the appropriate length and flow potential to dispense water at the desired rate of one gallon per hour at that pressure and installs the same at that location. Flow rate control valve 26 continues to deliver 100 gallons of water per hour at the head end of feeder tube 14 under a pressure of fifty psig, as maintained by pressure relief valve 28. Since one gallon of water per hour is being dispensed by emitter 24, relief valve 28 is automatically operative to close sufficiently to dump only 99 gallons of water per hour so as to maintain fifty psig at the start of the system. Following the procedure above, another hole is punched, the line pressure measured and a second emitter 24 selected and installed to deliver one gallon of water per hour at that measured pressure. This procedure is repeated along feeder tube 14, measuring the line pressures and installing emitters 24 at predetermined locations, such as indicated in full and dotted lines as shown at 24 in FIG. 1, to supply the desired gallon of water per hour at such locations, respectively. Upon each emitter installation, relief valve 28 progressively closes to discharge a correspondingly lesser amount through conduit 32 for maintaining the 50 psig head at the start of the system. Emitters 24 located upstream of those being installed are not in any way affected, the line pressures at the specific locations at which emitters 24 are being installed remaining the same. When all 100 emitters 24 are installed with each dispensing one gallon of water per hour, relief valve 28 will be closed and there will be no flow through discharge conduit 32. After all emitters are installed, relief valve 28 can be removed and the end of the feeder tube 14 plugged. Flow rate control valve 26 can then be replaced by a pressure regulator set at fifty psig to continue to supply 1 gallon of water per hour through each emitter 24.

From the foregoing, it is apparent that the objects of the present invention have been fully accomplished. The drip irrigation system provided by this invention greatly simplifies emitter installation by ordinary field installation personnel without regard to the pressure line gradient, eliminating complicated design calculations while obtaining a system of efficient water distribution.

One embodiment of this invention having been described and illustrated in detail, it is to be understood that this has been done by way of illustration only.

We claim:

1. A method of installing a drip irrigation system comprising: connecting a feeder tube to an irrigation fluid supply line and placing said tube along a path traversing a plurality of areas to be irrigated; providing a plurality of emitters operable to deliver fluid at a predetermined rate at various pressures, respectively; supplying a preselected total flow rate of fluid at a predetermined level of pressure to said tube; forming an opening in said tube at a predetermined location; measuring the pressure at said opening; selecting an emitter adapted to deliver said predetermined rate at said measured pressure; and installing said selected emitter at that location.

2. A method according to claim 1 including installing a plurality of emitters of varying flow potentials along the length of said tube as set forth in claim 1 and maintaining the pressure of said fluid at said predetermined level upstream of said emitters during the installation thereof.

3. A method according to claim 1 wherein the selected emitters normally are of progressively greater flow potential from the upstream end of said tube toward the downstream end thereof in accordance with the decreasing gradient pressure of said fluid flowing through said tube with appropriate allowance for change of pressure due to differences in elevation.

4. A method according to claim 2, wherein the varying flow potential of the emitters is obtained by varying the length thereof.

* * * * *